(12) United States Patent
Khajehosseini et al.

(10) Patent No.: US 11,976,946 B2
(45) Date of Patent: May 7, 2024

(54) SENSOR HOUSING WITH DEFLECTOR

(71) Applicant: Ford Global Technologies, LLC, Dearborn, MI (US)

(72) Inventors: Navvab Khajehosseini, Canton, MI (US); Rashaun Phinisee, Ypsilanti, MI (US); Segundo Baldovino, Novi, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 391 days.

(21) Appl. No.: 17/245,319

(22) Filed: Apr. 30, 2021

(65) Prior Publication Data

US 2022/0349734 A1    Nov. 3, 2022

(51) Int. Cl.
| | |
|---|---|
| *B60R 11/04* | (2006.01) |
| *G01D 11/24* | (2006.01) |
| *G01D 11/26* | (2006.01) |
| *B60R 11/00* | (2006.01) |
| *G05D 1/00* | (2006.01) |

(52) U.S. Cl.
CPC .............. *G01D 11/26* (2013.01); *B60R 11/04* (2013.01); *G01D 11/245* (2013.01); *B60R 2011/004* (2013.01); *G05D 1/0088* (2013.01); *G05D 2201/0213* (2013.01)

(58) Field of Classification Search
CPC ...... G01D 11/26; G01D 11/245; B60R 11/04; G05D 2201/0213
See application file for complete search history.

(56) References Cited

U.S. PATENT DOCUMENTS

2016/0236725 A1*  8/2016  Shirai ................. B62D 29/008
2020/0398765 A1* 12/2020  Krishnan ............... B60R 11/00

FOREIGN PATENT DOCUMENTS

| DE | 102016006039 A1 * | 11/2016 |
| DE | 102016006039 A1 | 11/2016 |
| DE | 102018217482 A1 * | 4/2020 |
| DE | 102018217482 A1 | 4/2020 |

* cited by examiner

*Primary Examiner* — Jamel E Williams
(74) *Attorney, Agent, or Firm* — Frank A. MacKenzie; Bejin Bieneman PLC

(57) ABSTRACT

An assembly includes a housing and a sensor supported by the housing. The assembly includes a deflector supported by the housing forward of the sensor. The deflector and the sensor define a spacing therebetween. The spacing is open to an ambient environment external of the housing. The deflector includes transparent material that permits light to pass through the deflector.

20 Claims, 7 Drawing Sheets

SENSOR HOUSING WITH DEFLECTOR

BACKGROUND

A vehicle can include a system or systems for autonomously or semi-autonomously operating the vehicle, e.g., an advanced driver assist system (ADAS) for speed control, lane-keeping, etc.

The system or systems for autonomously or semi-autonomously operating the vehicle may include a variety of object detection sensors such as are known to provide data to the vehicle computer. For example, Light Detection And Ranging (LIDAR) vehicle sensor(s), etc., may be disposed on a top of the vehicle, behind a vehicle front windshield, around the vehicle, etc., that provide relative locations, sizes, and shapes of objects surrounding the vehicle. As another example, one or more radar vehicle sensors may be fixed to vehicle bumpers may provide data to provide locations of the objects, second vehicles, etc., relative to the location of the vehicle. The system or systems may further alternatively or additionally, for example, include camera vehicle sensor(s), e.g., front view, side view, etc., providing images from an area surrounding the vehicle.

DETAILED DESCRIPTION

Figure 1:
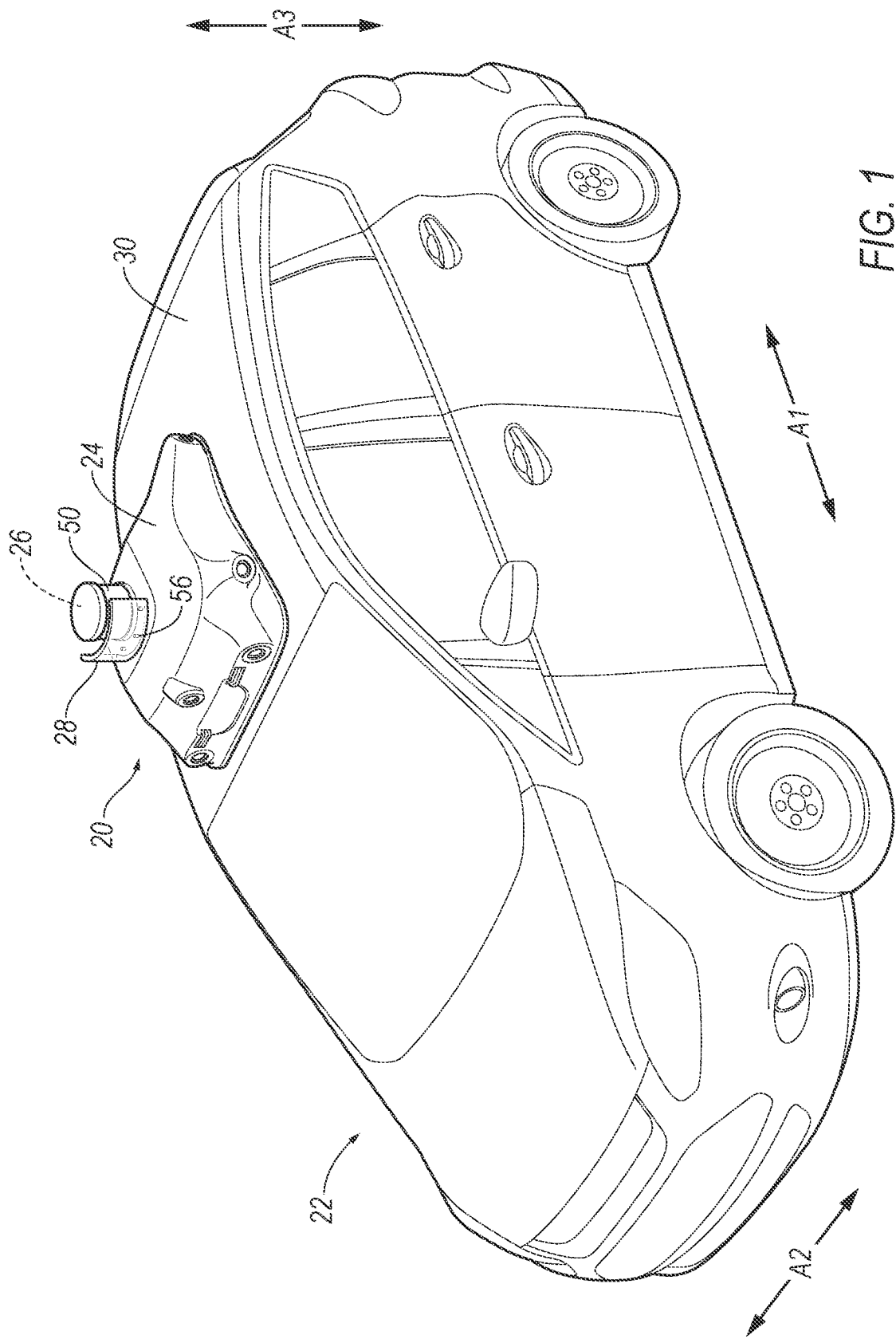
FIG. 1 is a perspective vehicle of a vehicle with a sensor assembly.

An assembly includes a housing and a sensor supported by the housing. The assembly includes a deflector supported by the housing forward of the sensor. The deflector and the sensor define a spacing therebetween. The spacing is open to an ambient environment external of the housing. The deflector includes transparent material that permits light to pass through the deflector.

The assembly may include a transparent shield supported by the housing between the sensor and the deflector.

The assembly may include a nozzle supported by the housing between the deflector and the sensor, the nozzle facing the sensor.

The deflector may be arcuate.

The deflector may include opposing lateral ends that are rearward of a lateral center of the deflector.

The deflector may extend upward from a top surface of the housing.

The housing may define a chamber, and the deflector may be movable between a deployed position outside the chamber and a stowed position within the chamber.

The assembly may include a track supported by the housing, the deflector moveable along the track between the deployed position and the stowed position.

The assembly may include an actuator operatively coupled to the deflector such that actuation of the actuator moves the deflector.

The assembly may include a computer in communication with the actuator, the computer having a processor and a memory storing instructions executable by the processor to move the deflector from the stowed position to the deployed position in response to determining that a vehicle supporting the assembly is traveling above a threshold speed.

An assembly includes a housing that defines a chamber. The assembly includes a sensor supported by the housing. The assembly includes a deflector supported by the housing forward of the sensor, the deflector movable between a deployed position outside the chamber and a stowed position within the chamber.

The assembly may include a track supported by the housing, the deflector moveable along the track between the deployed position and the stowed position.

The assembly may include an actuator operatively coupled to the deflector such that actuation of the actuator moves the deflector.

The assembly may include a computer in communication with the actuator, the computer having a processor and a memory storing instructions executable by the processor to move the deflector from the stowed position to the deployed position in response to determining that a vehicle supporting the assembly is traveling above a threshold speed.

The assembly may include a transparent shield supported by the housing between the sensor and the deflector.

The assembly may include a nozzle supported by the housing between the deflector and sensor, the nozzle facing the sensor.

The deflector may be arcuate.

The deflector may include opposing lateral ends that are rearward of a lateral center of the deflector.

The deflector in the deployed position may extend upward from a top surface of the housing.

With reference to FIGS. 1-6, an assembly 20, e.g., for collecting data used in autonomous operation of a vehicle 22, includes a housing 24. The assembly 20 includes a sensor 26 supported by the housing 24. The assembly 20 includes a deflector 28 supported by the housing 24 forward of the sensor 26. The deflector 28 and the sensor 26 define a spacing Si therebetween. The spacing Si is open to an ambient environment external of the housing 24. The deflector 28 includes transparent material that permits light to pass through the deflector 28. Light passing through the deflector 28 may be detectable by the sensor 26.

The vehicle 22 may be any suitable type of ground vehicle, e.g., a passenger or commercial automobile such as a sedan, a coupe, a truck, a sport utility, a crossover, a van, a minivan, a taxi, a bus, etc.

In the present application, relative vehicular orientations and directions (by way of example, top, bottom, front, rear, outboard, inboard, inward, outward, lateral, left, right, etc.) is from the perspective of an occupant seated in the vehicle 22 facing forward, e.g., toward a forward instrument panel and/or forward windshield of the vehicle 22. The forward direction of the vehicle 22 is the direction of movement of the vehicle 22 when the vehicle 22 is engaged in forward drive with wheels of the vehicle 22 straight. Orientations and directions relative to the assembly 20 are given related to when the assembly 20 is supported by the vehicle 22 as described below and shown in the Figures.

The vehicle 22 defines a longitudinal axis A1 extending between a front and a rear of the vehicle 22. The vehicle 22 defines a cross-vehicle axis A2 extending between a left side and a right side of the vehicle 22. The vehicle 22 defines a vertical axis A3 extending between a top and a bottom of the vehicle 22. The longitudinal axis A1, the cross-vehicle axis A2, and the vertical axis A3 are perpendicular relative to each other.

The vehicle 22 may be an autonomous vehicle. A computer 58 can be programmed to operate the vehicle 22 independently of the intervention of a human driver, completely or to a lesser degree. The computer 58 may be programmed to operate a propulsion, brake system, steering, and/or other vehicle systems based at least in part on data received from the sensor 26. For the purposes of this disclosure, autonomous operation means the computer 58 controls the propulsion device, brake system, and steering system without input from a human driver; semi-autonomous operation means the computer 58 controls one or two of the propulsion system, brake system, and steering system and a human driver controls the remainder; and nonautonomous operation means a human driver controls the propulsion system, brake system, and steering system.

The vehicle 22 may include a vehicle body. The vehicle body includes body panels partially defining an exterior of the vehicle. The body panels may present a class-a surface, e.g., a finished surface exposed to view by a customer and free of unaesthetic blemishes and defects. The body panels include, e.g., a roof 30, etc.

Figure 4:
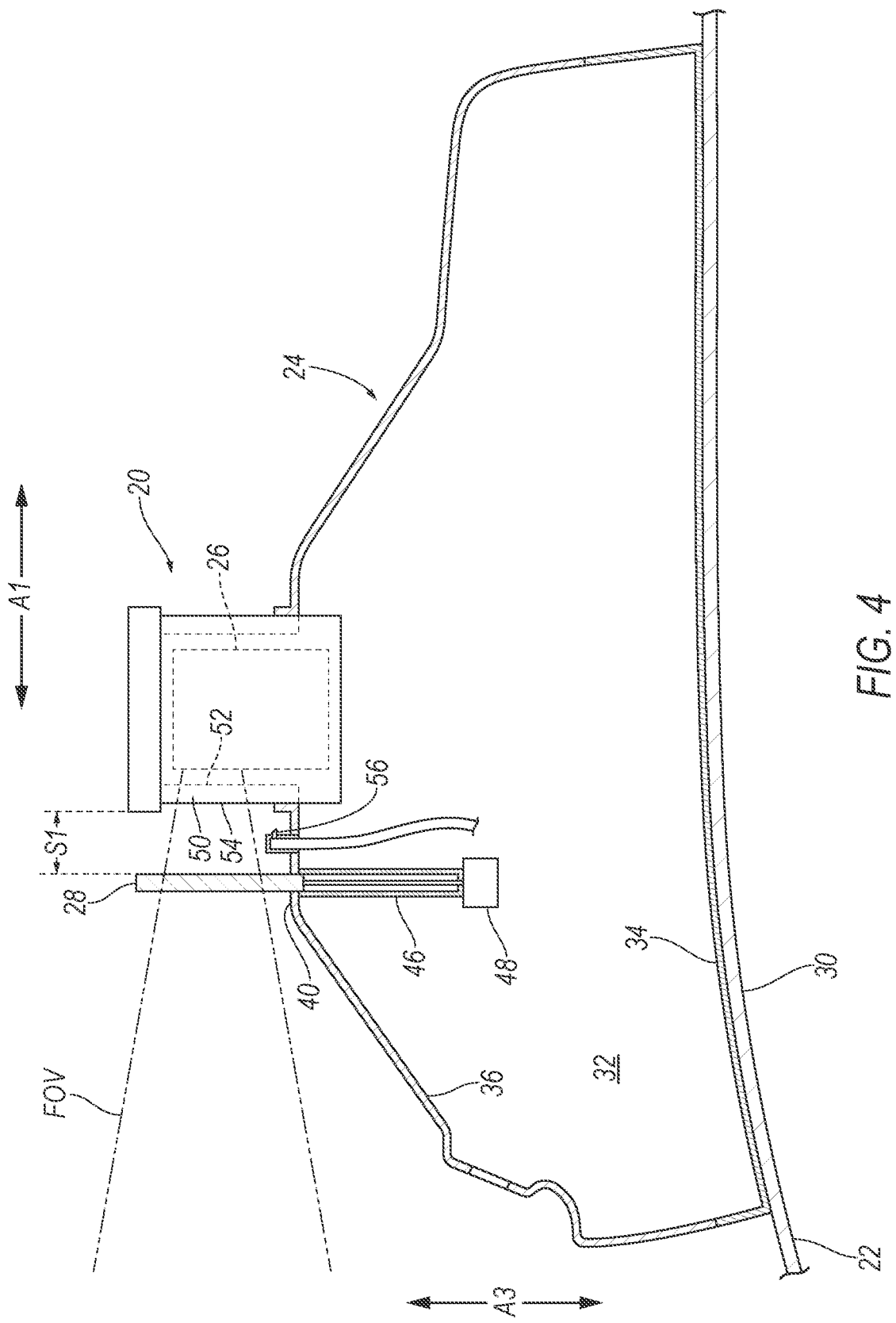
FIG. 4 is a cross-section view of the sensor assembly with the deflector in the deployed position.
Figure 6:
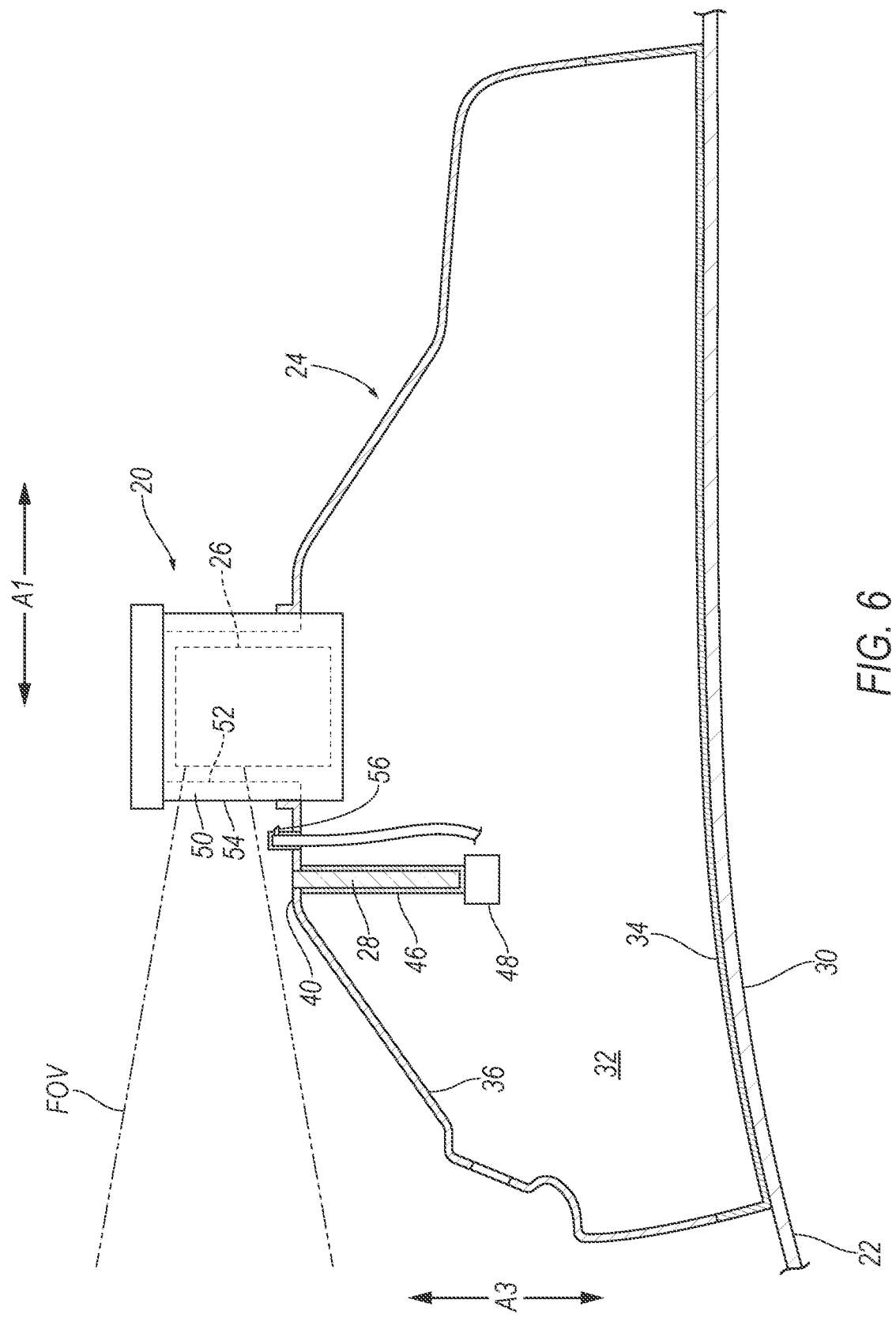
FIG. 6 is a cross-section view of the sensor assembly with the deflector in the stowed position.

The housing 24 defines, e.g., encloses, a chamber 32, shown in FIGS. 4 and 6. The chamber 32 may be between a lower portion 34 and an upper portion 36 of the housing 24. The upper portion 36 may cover and fit on top of the lower portion 34. The upper portion 36 and the lower portion 34 may be plastic or any suitable material. The lower portion 34 may be fixed to the upper portions 36, e.g., with a fastener or the like. The housing 24, e.g., the lower portion 34, is attachable to the vehicle 22, e.g., to one of the body panels of the vehicle 22. The sensor 26 is supported by and/or disposed in the housing 24. The housing 24 may enclose and protect operational components of the sensor 26. The housing 24 may be shaped to be attachable to the roof 30, e.g., the lower portion 34 may have a shape matching a contour of the roof 30. The housing 24 may be attached to the roof 30, which can provide the sensor 26 with an unobstructed field of view FOV of an area around the vehicle 22.

The sensor 26 detects objects. The sensor 26, more specifically, may be an object detection sensor. The sensor 26 may include a variety of devices such as are known to provide data to the computer 58. Examples of object detection sensors 26 may include Light Detection And Ranging (LIDAR) sensor(s) that provide relative locations, sizes, and shapes of objects surrounding the vehicle 22. Object detection sensors 26 may further alternatively or additionally, for example, include camera vehicle sensor(s), e.g., front view, side view, etc., providing images from an area surrounding the vehicle 22. In the context of this disclosure, an object is a physical, i.e., material, item that can be represented by physical phenomena (e.g., light or other electromagnetic waves, or sound, etc.) detectable by the sensor 26. Thus, vehicles, as well as other items including as discussed below, fall within the definition of "object" herein.

The deflector 28 deflects air, e.g., around the sensor 26 when the vehicle 22 is traveling above a threshold speed. For example, relative movement between the deflector 28 and ambient air may urge such air above and outboard of the sensor 26. Urging air around the sensor 26 reduces an amount of water and other debris that may interfere with data collection by the sensor 26. For example, urging air around the sensor 26 may reduce a likelihood of such debris impacting the sensor 26 and/or a transparent shield 50 supported by the housing 24 between the sensor 26 and the deflector 28.

The deflector 28 is supported by the housing 24 forward of the sensor 26. In other words, the deflector 28 may be between the sensor 26 and a front of the vehicle 22. The deflector 28 forward of the sensor 26 enables the deflector 28 to urge air around the sensor 26 when the vehicle 22 is traveling forward, e.g., above the threshold speed.

The deflector 28 can include transparent material that permits light to pass through the deflector 28. The light passing through the transparent material of the deflector 28 may be detected by the sensor 26. The deflector 28 may be glass, plastic or other suitable transparent material that permits light detectable by the sensor 26 to pass therethrough.

Figure 2:
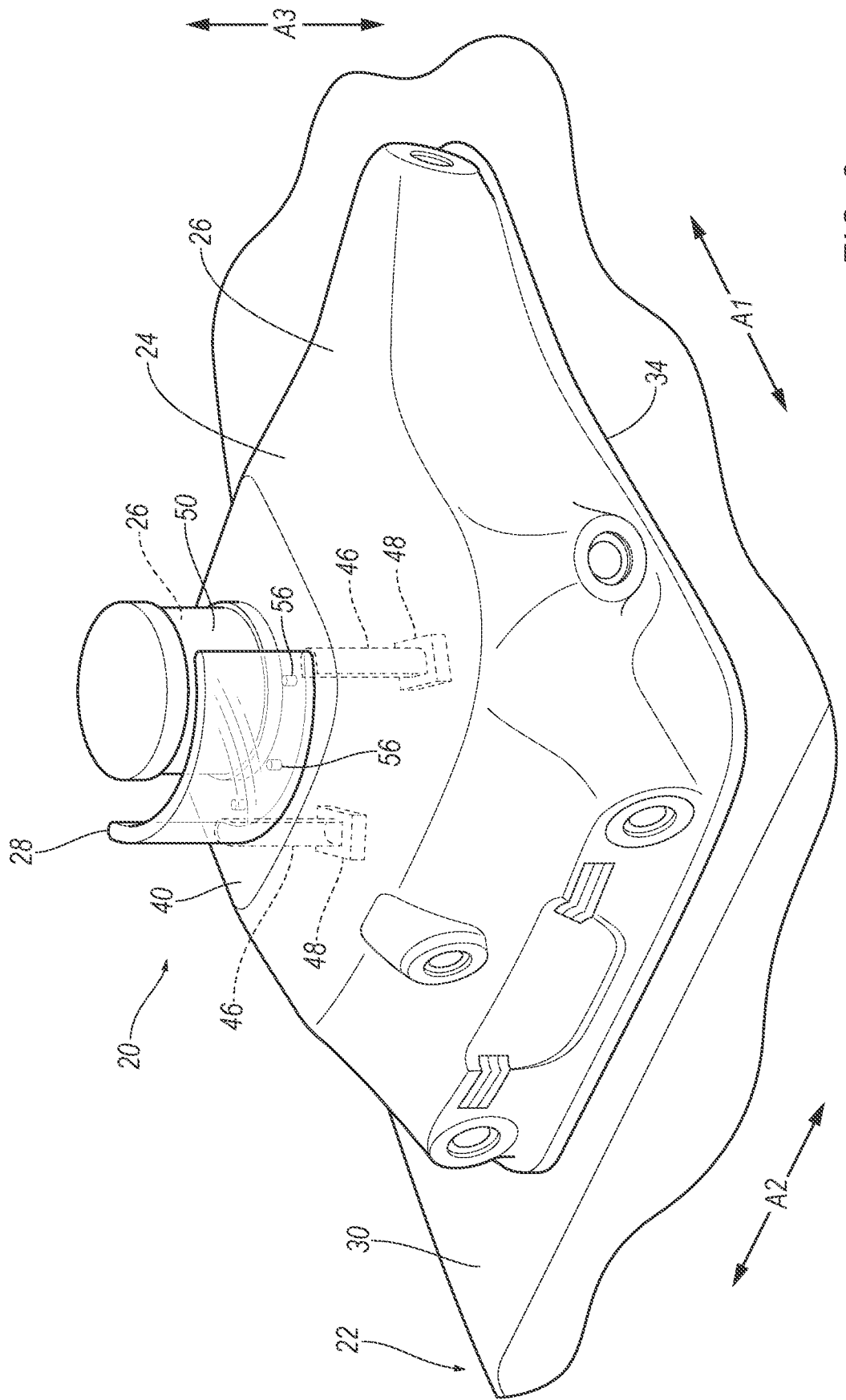
FIG. 2 is a perspective view of the sensor assembly with a deflector in a deployed position.
Figure 5:
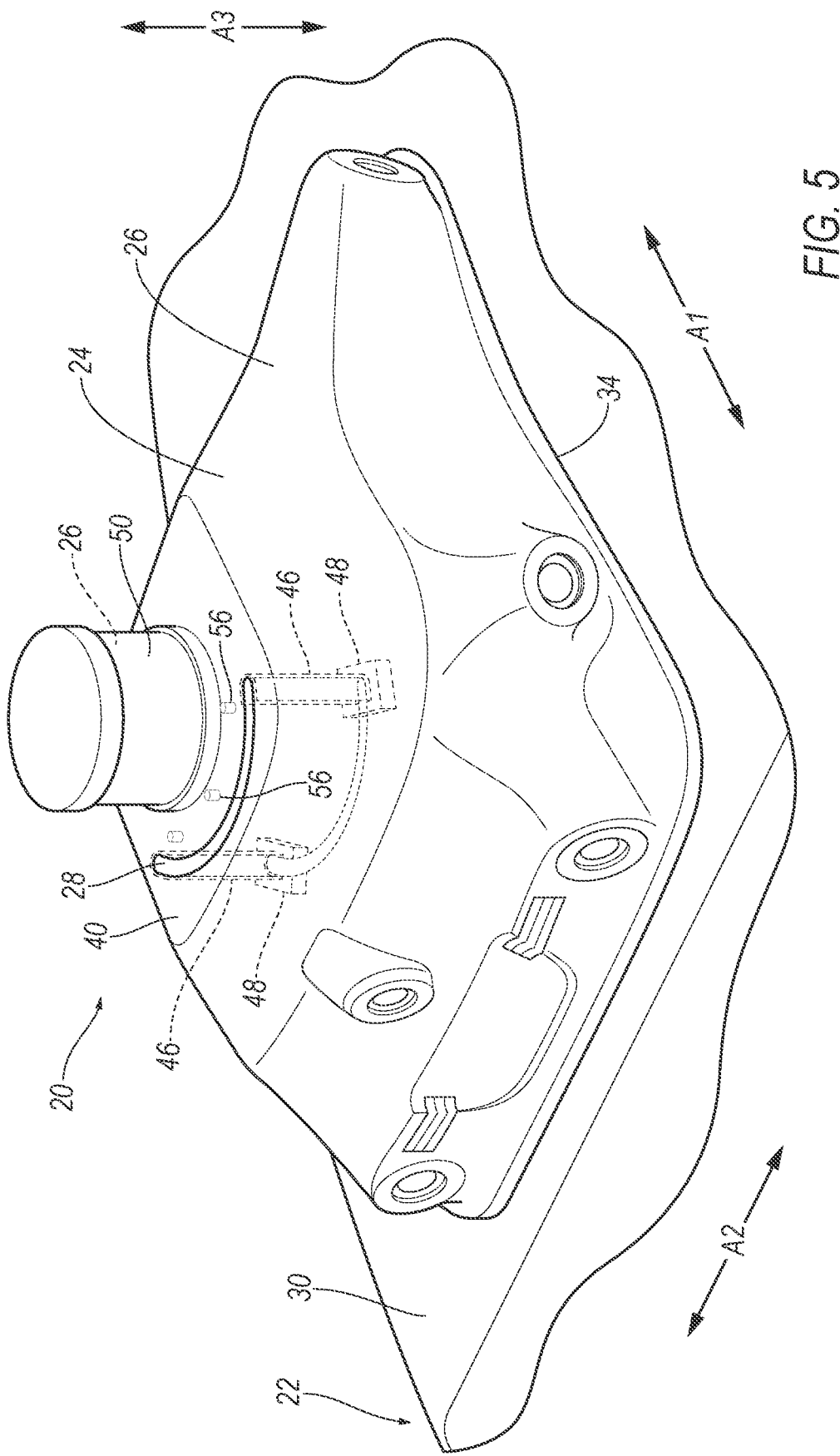
FIG. 5 is a perspective view of the sensor assembly with the deflector in a stowed position.

The deflector 28 may be movable between a deployed position, shown in FIGS. 2 and 4, and a stowed position, shown in FIGS. 5 and 6. The deflector 28 in the deployed position is outside the chamber 32, e.g., to deflect ambient air around the sensor 26. The deflector 28 in the stowed position is within the chamber 32, e.g., between the lower portion 34 of the housing 24 and upper portion 36 of the housing 24. The deflector 28 in the chamber 32 protects the deflector 28. The deflector 28 in the housing 24 is outside the field of view FOV of the sensor 26. The deflector 28 may be move between the deployed position and the stowed position through a slot or the like in the housing 24, e.g., in the upper portion 36.

With reference to FIGS. 2 and 4, the deflector 28 extends upward from a top surface 40 of the housing 24, e.g., in the deployed position. The top surface 40 may be opposite, i.e., face away from, the chamber 32. For example, the deflector 28 may extend from the upper portion 36 along the vertical axis A3 and away from the chamber 32.

As shown in FIG. 4, the deflector 28 and sensor 26 define the spacing Si therebetween, e.g., along the lateral axis. The spacing Si is open to an ambient environment external of the housing 24, e.g., such that ambient air is uninhibited from flowing into and out of the spacing Si between the deflector 28 and the sensor 26. The spacing Si is external and isolated from the chamber 32.

Figure 3:
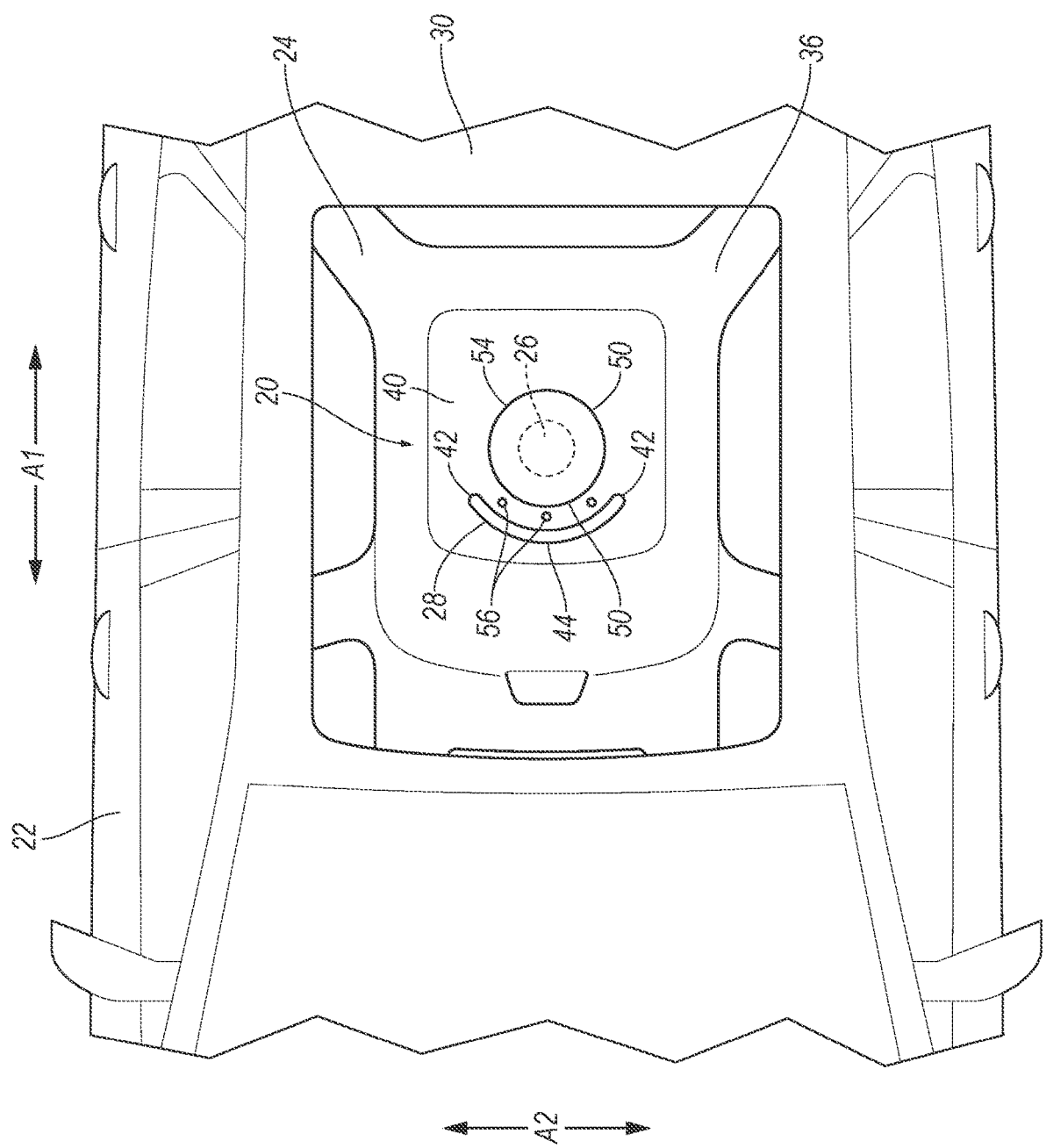
FIG. 3 is a top view of the sensor assembly.

With reference to FIG. 3, the deflector 28 may be arcuate, e.g., having a curved profile when viewed from above. The arcuate shape may aid in efficiently direct air around the sensor 26. The deflector 28 can include opposing lateral ends 42 that are rearward of a lateral center 44 of the deflector 28, e.g., along the longitudinal axis A1. For example, a line tangent to the deflector 28 at the lateral center 44 may be parallel to the cross-vehicle axis A2, the deflector 28 may extend and curve outward and rearward from the lateral center 44 to the lateral ends 42.

Returning to FIGS. 2 and 4-6, one or more tracks 46 may support and enable movement of the deflector 28 between the stowed position and the deployed position. In other words, the deflector 28 may be moveable along the tracks 46 between the deployed position and the stowed position. The tracks 46 may be elongated along the vertical axis A3. The tracks 46 may include rails, channels, grooves, lips, etc., that are elongated along the vertical axis A3. The rails, channels, grooves, lips, etc., may permit movement, e.g., of the deflector 28, along the vertical axis A3 and inhibit movement along the longitudinal axis A1 and the cross-vehicle axis A2. The tracks 46 may be supported by the housing 24. For example, the track 46 may be fixed to the upper portion 36 of the housing 24 via fastener, weld, etc., and extend downward toward the lower portion 34.

The assembly 20 may include an actuator 48 operatively coupled to the deflector 28 such that actuation of the actuator 48 moves the deflector 28, e.g., along the track 46 from the deployed position to the stowed position and vice versa. The actuator 48 may be fixed to one of the tracks 46, the housing 24, or any suitable structure. The actuator 48 may include a motor, reduction gear, a worm gear, a rack and pinion, pullies, belts, chains, and/or any other electromechanical and/or hydraulic structure suitable for moving the deflector 28 along the tracks 46. For example, the actuator 48 may be a linear actuator that actuates to change a length between ends of the actuator 48, e.g., a linear servo, a screw type including a threaded shaft and hole, a hydraulic type including a piston and cylinder, etc. Such actuator 48 may have one end fixed to the deflector 28 and an opposite end fixed to one of the tracks 46, the housing 24, etc. The actuator 48 may move the deflector 28 in response to a command from the computer 58. Although only one actuator 48 is illustrated, the assembly 20 may include additional actuators 48, e.g., with one actuator 48 at each of the tracks 46.

The transparent shield 50 is between the sensor 26 and the deflector 28, e.g., along the longitudinal axis A1. The transparent shield 50 protects components of the sensor 26 from dirt, water, and other objects that may damage the sensor 26. The transparent shield 50 permits light to pass therethrough to the sensor 26. The transparent shield 50 may be a lens, e.g., the transparent shield 50 may focus light onto the sensor 26. The transparent shield 50 may be formed of glass, plastic or other suitable transparent material. The transparent shield 50 may be supported by the sensor 26, e.g., as a component of the sensor 26. The transparent shield 50 may be supported by the housing 24, e.g., fixed to the upper portion 36. As shown in FIGS. 4 and 6, the transparent shield 50 may include inner surface 52 that faces the sensor 26 and an outer surface 54 that faces away from the sensor 26. The inner surface 52 may be isolated from ambient air. For example, the inner surface 52 may face the chamber 32. The outer surface 54 is not isolated from ambient air, e.g., the outer surface 54 may face away from the chamber 32 and be exposed to ambient air.

The assembly 20 may include a nozzle 56 supported by the housing 24 between the deflector 28 and the sensor 26. For example, the nozzle 56 may be fixed to the upper portion 36 of the housing 24. The nozzle 56 faces the sensor 26, i.e., such that fluid ejected from the nozzle 56 flow at, or across the field of view FOV of the sensor 26. For example, fluid from the nozzle 56 may be directed toward the transparent shield 50. The nozzle 56 may be in fluid communication with a fluid reservoir, e.g., via supply lines. A pump may urge fluid from the fluid reservoir through the supply lines to the nozzle 56.

Figure 7:
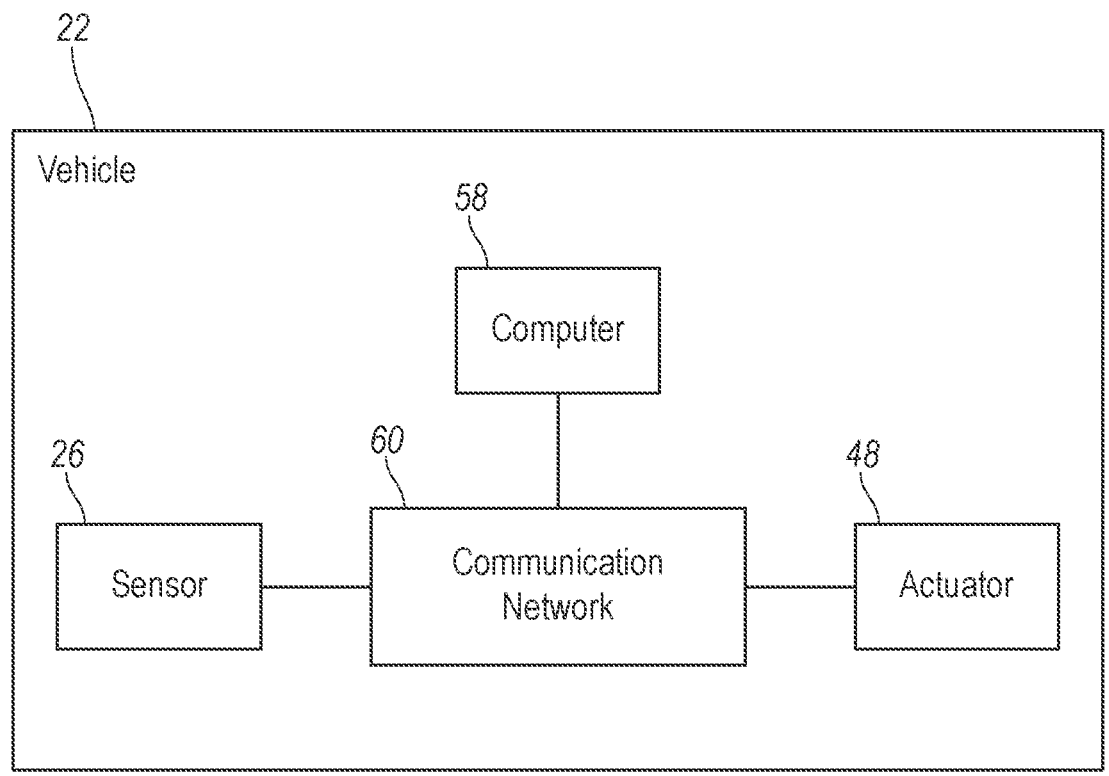
FIG. 7 is a block diagram of components of the vehicle.

With reference to FIG. 7, the computer 58 includes a processor and a memory such as are known. The memory includes one or more forms of computer 58 readable media, and stores instructions executable by the computer 58 for performing various operations, including as disclosed herein. For example, the computer 58 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, computer 58 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 58. The memory can be of any type, e.g., hard disk drives, solid state drives, servers, or any volatile or non-volatile media. The memory can store the collected data sent from the sensors 26. The memory can be a separate device from the computer 58, and the computer 58 can retrieve information stored by the memory via a network in the vehicle 22, e.g., over a CAN bus, a wireless network, etc. Alternatively or additionally, the memory can be part of the computer 58, e.g., as a memory of the computer 58. The computer 58 may include programming to operate one or more of vehicle 22 brakes, propulsion (e.g., control of acceleration in the vehicle 22 by controlling one or more of an internal combustion engine, electric motor, hybrid engine, etc.), steering, climate control, interior and/or exterior lights, etc., as well as to determine whether and when the computer 58, as opposed to a human operator, is to control such operations. Additionally, the computer 58 may be programmed to determine whether and when a human operator is to control such operations. The computer 58 may include or be communicatively coupled to, e.g., via a vehicle communication network such as a communications bus as described further below, more than one processor, e.g., included in components such as sensors 26, electronic controller units (ECUs) or the like included in the vehicle 22 for monitoring and/or controlling various vehicle components, e.g., a powertrain controller, a brake controller, a steering controller, etc. The computer 58 is generally arranged for communications on a vehicle communication network that can include a bus in the vehicle 22 such as a controller area network (CAN) or the like, and/or other wired and/or wireless mechanisms. Alternatively or additionally, in cases where the computer 58 actually comprises a plurality of devices, the vehicle 22 communication network may be used for communications between devices represented as the computer 58 in this disclosure. Further, as mentioned below, various controllers and/or sensors 26 may provide data to the computer 58 via the vehicle 22 communication network.

A vehicle communication network can include a conventional vehicle communications bus such as a CAN bus, LIN bus, etc., and or other wired and/or wireless technologies, e.g., Ethernet, Wi-Fi®, cellular, Bluetooth®, Bluetooth® Low Energy (BLE), etc. Via the network, bus, and/or other wired or wireless mechanisms (e.g., a wired or wireless local area network in the vehicle 22). Accordingly, the computer 58, etc., may transmit messages to various devices in the vehicle 22 and/or receive messages from the various devices, e.g., ECUs, controllers, the actuators 48, the sensors 26, other vehicle sensors (such as a speed sensor), etc.

The computer 58 is programmed to, i.e., the memory stores instructions executable by the processor to, move the deflector 28 from the stowed position to the deployed position in response to determining that the vehicle 22 is traveling above a threshold speed. The computer 58 may move the deflector 28 from the deployed position to the stowed position in response to determining that the vehicle 22 is traveling below the threshold speed.

The computer 58 may move the deflector 28 to the deployed position or the stowed position by transmitting a command through the vehicle communication network to the actuator 48, e.g., specifying a certain length or position of the actuator 48.

The computer 58 may determine whether the vehicle 22 is traveling above or below the threshold speed by comparing a detected speed of the vehicle 22 with the speed threshold. The computer 58 may detect the speed of the vehicle 22 with data from a vehicle 22 speed sensor 26 or the like received via the vehicle communication network.

The threshold speed is a speed at which ambient air is urged around the sensor 26. The threshold speed may be determined with empirical testing, e.g., wind tunnel or computer 58 simulation testing of the assembly 20 and indicting a wind speed at which the deflector 28 urges air around the sensor 26.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

The invention claimed is:

1. An assembly, comprising:
   a housing;
   a sensor supported by the housing;
   a deflector supported by the housing forward of the sensor;
   the deflector and the sensor define a spacing therebetween, the spacing open to an ambient environment external of the housing; and
   the deflector includes transparent material that permits light to pass through the deflector.

2. The assembly of claim 1, further comprising a nozzle supported by the housing between the deflector and the sensor, the nozzle facing the sensor.

3. The assembly of claim 1, wherein the deflector is arcuate.

4. The assembly of claim 1, wherein the deflector includes opposing lateral ends that are rearward of a lateral center of the deflector.

5. The assembly of claim 1, wherein the deflector extends upward from a top surface of the housing.

6. The assembly of claim 1, wherein the housing defines a chamber, and the deflector is movable between a deployed position outside the chamber and a stowed position within the chamber.

7. The assembly of claim 6, further comprising a track supported by the housing, the deflector moveable along the track between the deployed position and the stowed position.

8. The assembly of claim 6, further comprising an actuator operatively coupled to the deflector such that actuation of the actuator moves the deflector.

9. The assembly of claim 6, further comprising a computer in communication with the actuator, the computer having a processor and a memory storing instructions executable by the processor to move the deflector from the stowed position to the deployed position in response to determining that a vehicle supporting the assembly is traveling above a threshold speed.

10. An assembly, comprising:
    a housing that defines a chamber;
    a sensor supported by the housing; and
    a deflector supported by the housing forward of the sensor, the deflector movable between a deployed position outside the chamber and a stowed position within the chamber.

11. The assembly of claim 10, further comprising a track supported by the housing, the deflector moveable along the track between the deployed position and the stowed position.

12. The assembly of claim 10, further comprising an actuator operatively coupled to the deflector such that actuation of the actuator moves the deflector.

13. The assembly of claim 12, further comprising a computer in communication with the actuator, the computer having a processor and a memory storing instructions executable by the processor to move the deflector from the stowed position to the deployed position in response to determining that a vehicle supporting the assembly is traveling above a threshold speed.

14. The assembly of claim 10, further comprising a transparent shield supported by the housing between the sensor and the deflector.

15. The assembly of claim 10, further comprising a nozzle supported by the housing between the deflector and sensor, the nozzle facing the sensor.

16. The assembly of claim 10, wherein the deflector is arcuate.

17. The assembly of claim 10, wherein the deflector includes opposing lateral ends that are rearward of a lateral center of the deflector.

18. The assembly of claim 10, wherein the deflector in the deployed position extends upward from a top surface of the housing.

19. An assembly, comprising:
    a housing;
    a sensor supported by the housing;
    a deflector supported by the housing forward of the sensor; and
    a transparent shield supported by the housing between the sensor and the deflector;
    the deflector and the sensor define a spacing therebetween, the spacing open to an ambient environment external of the housing; and
    the deflector includes transparent material that permits light to pass through the deflector.

20. The assembly of claim 19, wherein the sensor defines a field of view, and the deflector is in the field of view of the sensor.

* * * * *